US008826516B2

United States Patent
Bopple et al.

(10) Patent No.: US 8,826,516 B2
(45) Date of Patent: Sep. 9, 2014

(54) METHOD FOR APPLYING MAGNETS

(75) Inventors: Stefan Bopple, Filderstadt (DE); Thomas Hannusch, Stuttgart (DE)

(73) Assignee: Thyssenkrupp Elevator AG, Essen (DE)

( * ) Notice: Subject to any disclaimer, the term of this patent is extended or adjusted under 35 U.S.C. 154(b) by 185 days.

(21) Appl. No.: 13/074,177

(22) Filed: Mar. 29, 2011

(65) Prior Publication Data
US 2012/0073119 A1  Mar. 29, 2012

Related U.S. Application Data

(63) Continuation of application No. PCT/EP2009/008495, filed on Nov. 27, 2009.

(30) Foreign Application Priority Data

Nov. 28, 2008  (EP) ..................................... 08020714

(51) Int. Cl.
H01F 7/06 (2006.01)
H02K 15/03 (2006.01)

(52) U.S. Cl.
CPC ..................................... *H02K 15/03* (2013.01)
USPC ................ 29/607; 29/596; 29/602.1; 29/469; 336/176; 336/200; 336/229

(58) Field of Classification Search
USPC ................ 29/592.1, 596, 604, 606, 607, 609; 336/176, 200, 229
See application file for complete search history.

(56) References Cited

U.S. PATENT DOCUMENTS

| 3,742,310 | A | * | 6/1973 | Ehrat .............................. 361/159 |
| 4,586,244 | A | | 5/1986 | Muller |
| 6,891,710 | B2 | * | 5/2005 | Mayr et al. ..................... 361/147 |
| 7,882,613 | B2 | * | 2/2011 | Barthelmie et al. ............. 29/596 |
| 2003/0011454 | A1 | * | 1/2003 | Mayr et al. ..................... 335/256 |
| 2005/0246886 | A1 | * | 11/2005 | Morel .............................. 29/596 |

FOREIGN PATENT DOCUMENTS

| CN | 2904448 A | 5/2007 |
| DE | 102004039807 | 2/2006 |
| EP | 1 605 574 A1 | 12/2005 |
| EP | 1826889 | 8/2007 |
| EP | 1 903 665 | 3/2008 |
| JP | 03-122381 A | 5/1991 |
| JP | 4-17081 A | 2/1992 |
| JP | 2007-228792 A | 9/2007 |

* cited by examiner

*Primary Examiner* — Paul D Kim
(74) *Attorney, Agent, or Firm* — Shlesinger, Arkwright & Garvey LLP

(57) ABSTRACT

A method for applying at least one magnet, a holding device for such a method, and an arrangement comprising a number of holding devices. The method is used for applying at least one magnet to a surface of a part made of a magnetic material. The at least one magnet is moved towards the surface of the part while being retained in the holding device using a retaining force, and a force of attraction that acts against the retaining force is substantially directed towards the part and is applied to the at least one magnet such that the magnet is transferred to the surface of the part as soon as the magnet has been moved towards the surface of the part so as to be at a certain distance therefrom at which the force of attraction exceeds the retaining force.

13 Claims, 3 Drawing Sheets

METHOD FOR APPLYING MAGNETS

RELATED APPLICATIONS

This is a continuation application of PCT International Application No. PCT/EP2009/008495, filed on Nov. 27, 2009, which claims the priority benefit of EPC 08020714.5, filed on Nov. 28, 2008, both of which are hereby incorporated by reference.

FIELD OF THE INVENTION

The invention relates to a method and a holding device for applying at least one magnet to a surface of a part made of a magnetic material. The invention further relates to an arrangement having a plurality of such holding devices.

The method according to the invention and the corresponding device are in particular provided for equipping rotors with permanent magnets for electric motors, in particular for electric motors for lifts.

BACKGROUND OF THE INVENTION

For lift drives, motors having rotors equipped with permanent magnets are used. In this case, the rotors can be configured as inrunners having permanent magnets arranged at the outside or as outrunners having permanent magnets arranged at the inside. For equipping the rotor with permanent magnets, it is known to apply the magnets by hand to the surface of the rotor which represents a relatively large effort, however. Therefore, increasingly methods and devices enabling an automatic application of the magnets are used.

From the document EP 1 826 889 A1, a method and a holding device for applying magnets to a part are known. In this method, at least one magnet is applied to the surface of the part, wherein the magnet in the immediate vicinity of the part is retained in the holding device by a retaining force acting by means of a holding element. In this method, the magnet is first positioned relative to the part, and then the applied retaining force is reduced by deactivating the holding element so that the magnet is transferred to the surface of the part.

The document US 2005/246886 A1 describes a method for positioning and mounting magnets on a magnetic element of a motor. Herein, a magnet to be applied is retained in a holding device and positioned relative to the magnetic element. In this process, the magnet is retained by a force of attraction in a holding device. By lowering this force of attraction and/or by increasing a force pulling the magnet to the magnetic element, a transfer of the magnet to the magnetic element is effected.

From the document U.S. Pat. No. 4,748,738, a method for positioning a pair of magnets on a surface of an iron containing pole piece in a predetermined spatial relationship is known. In this method, the magnets are first held in a position by means of a retaining force. The magnets are subsequently caused to be transferred to the surface of the pole piece in their final position. This is achieved by pushing the magnets from slits by pushers.

The document DE 10 2004 039 807 A1 describes a method for mounting a permanent magnet with the front side of it at a support. In this method, the permanent magnet is held at the support by a first force. In this process, the permanent magnet is inserted into a holder so that the rear of the permanent magnet is supported by the holder and its front side protrudes from the holder. Subsequently, a second force directed to the rear side which is larger than or equal to the first force is applied to the permanent magnet. Subsequently, the holder is moved towards the support until the front side of the permanent magnet abuts the support. The second force is then diminished so that it is lower than the first force. Subsequently, the holder is retracted.

In the known methods, it is necessary to use additional elements such as pushers or to alter the acting forces by additional control measures.

SUMMARY OF THE INVENTION

The presented method serves for applying at least one magnet to a surface of a part made of a magnetic material. In the process, the at least one magnet is retained by a retaining force in a holding device and moved towards the surface of the part, wherein a force of attraction that acts against or contrarily to the retaining force and is substantially directed towards the part is applied to the at least one magnet such that the magnet is transferred to the surface of the part as soon as the magnet has been moved towards the surface of the part so as to be at a certain distance therefrom at which the force of attraction exceeds the retaining force.

The magnet which in general is a permanent magnet is typically retained by a magnetic force in the holding device. This magnetic force represents the retaining force. In addition, the part made of a magnetic material exerts a force of attraction on the magnet which is also a magnetic force. If the magnet is moved towards the part by the holding device, the distance between the part and the magnet is reduced continuously, and the force of attraction between the magnet and the part increases correspondingly. In this case, the movement of approach is a regular continuous movement. In a certain predetermined distance, the force of attraction acting upon the magnet exceeds the retaining force so that the magnet is transferred to the surface. In this transfer, the magnet "flies" "freely over" and can "find itself" in the correct position and alignment on the surface. In the course of this transfer, the magnet can be guided to a certain degree. This can be achieved by corresponding guiding means at the holding device such as guiding pins and guiding pockets.

After and also during the transfer of the magnet, the movement of the holding device for effecting the approaching motion is usually maintained. Thus, a continuous movement of the holding device towards the surface of the part can be effected in the course of which the transfer of the at least one magnet to the surface of the part occurs.

Therefore, no additional means for carrying out the method are required. It is further not required to vary the exerted forces directly and in a controlled manner. Merely by varying the distance between the part surface and the magnet, it is achieved that the force of attraction exceeds the retaining force so that a free transfer occurs.

In a configuration of the method, a side of the at least one magnet facing the surface of the part is at least partially provided with an adhesive. The application of the adhesive can in this process be carried out in another previously carried out operation, possibly in an automated manner.

In the choice of the adhesive which can also be a two-component adhesive, it should be kept in mind that it has to be functional in a broad temperature range. In the application of the adhesive, it should also be paid attention to not cause any air trappings. Another effect of the adhesive is to dampen the impact of the magnet upon the surface of the part. The adhesive thus also acts as a buffer.

After hardening, the adhesive guarantees the secure mounting of the magnet at the surface. This is in particular important if magnets are applied in close distances with respect to each other because attracting and repelling forces between the individual magnets can cause a shifting of the magnets. For example, on rotors several rows of adjacent magnets exerting forces upon each other are provided.

In one embodiment, the holding device is further moved towards the surface after the magnet has been transferred to the surface so that the at least one magnet is pressed onto the surface of the part with a compression force that can regularly be determined previously. This means that the holding device or its movable parts can continuously be moved towards the surface. Before the magnet contacts the surface, the force of attraction exceeds the retaining force, and the magnet is transferred. This transfer motion can be guided to a certain extent. After the transfer of the magnet, the holding device is moved further and after a certain time again contacts the magnet which also is in contact with the surface of the part. Then, the magnet can be pressed onto the surface by the holding device. This can, for example, contribute to the distribution of the adhesive. This pressing process is generally applied with a predetermined pressing force for a time of e.g. 90 seconds until the adhesive has hardened.

In a configuration, after the at least one magnet has been transferred, a relative motion of the magnet towards the surface of the part which is substantially orthogonal to the direction of approach is effected. This relative motion is thus effected after the magnet has been transferred to the surface and causes a correct positioning of the magnet on the surface. In the course of this motion, the magnet can thus be approached to another magnet so that they even contact each other. Such a positioning could hardly be realized in a free transfer.

After positioning, the magnet can be pressed onto the surface. In this case, the magnet is thus first moved towards the surface, and after the magnet has been transferred to the surface, it is correctly positioned and subsequently pressed onto the surface. The positioning of the magnet means a displacement of the magnet on the surface also causing a distribution of the adhesive. In the positioning process, the magnet is typically directed or guided in a guiding means of the holding device. If the holding device or the movable part of the holding device is accelerated with an impact of 9 bar, for example, it can also be pushed onto the surface with 9 bar.

The relative movement can be effected by moving the part. In this case, the holding device can carry out a continuous movement superimposed by a movement of the part orthogonal to the movement of the holding device after the magnet has been transferred. In the course of this continuous motion, the magnet is first moved towards the surface until it is transferred. After it has been transferred, the holding device is further moved, and in this period, the positioning is effected by the superimposed movement of the part. Subsequently, the holding device presses the magnet against the surface. Herein, the movement of the holding device is carried out in one operation.

The relative movement can alternatively and/or additionally be effected by moving the holding device.

It can be provided that a plurality of magnets arranged in a row are applied to the surface of the part in one operation. This is important, for example, if a rotor of an electric motor is equipped with magnets. In this case, a respective row of magnets is mounted on the surface of the rotor in a number of operations. Thus, overlying rows of magnets are mounted at the rotor.

Furthermore, a holding device for applying at least one magnet, in particular for carrying out a method described above, is described. The holding device comprises a piston movable in a cylinder space, wherein at the front end of the piston a support for holding a magnet is provided and wherein this support is at least partially made of a magnetic material. At this support, the guiding means for guiding the magnet during the transfer and also for retaining the magnet during the positioning process is provided. The cylinder is operated pneumatically, for example.

By selecting different materials, in particular magnetic and non-magnetic materials, the retaining force acting upon the magnet located in the support can be predetermined exactly.

Thus, the support can consist of a core of a magnetic material surrounded by a frame of a non-magnetic material.

In a configuration, the holding device is provided with a guiding means in the region of the support. This guiding means cooperates with guiding means of adjacent holding devices so that it is guaranteed that several holding devices move synchronously.

The guiding means can comprise at least one bolt and at least one shaft facing each other.

In a configuration, a sensor for detecting the position of the reciprocating piston is provided at the holding device. In particular, a detection of the final position is advantageous in order to guarantee the functioning of the holding device. This can also be performed by a merely mechanical feedback.

Furthermore, an arrangement comprising a plurality of holding devices of the above described kind is presented which serves for applying a plurality of magnets to a surface of a part made of a magnetic material. In this context, each holding device carries one magnet so that a corresponding number of magnets can be applied in one operation. In the control of the individual holding devices, care should be taken that the leads to the individual holding devices have the same length so that they move synchronously. This can also be supported by cooperating guiding means at the holding devices.

It can be provided that the holding devices are arranged in a circle facing each other. This means that the holding devices are arranged in a circular or annular shape so that a correspondingly shaped part, e.g. a cylindrical part, can be equipped with magnets on the inside or on the outside.

The presented method and the holding device and the arrangement thus, at least in the described embodiments, enable a safe, rapid and economical application of magnets to a surface of a part made of a magnetic material. Another advantage is that the method can be carried out in an automatic and robot-assisted manner.

Other advantages and configurations of the invention will be clear with respect to the specification and the accompanying drawings.

It should be understood that the above features and the features to be explained below can be used not only in the respective indicated combination but also in other combinations or individually without leaving the scope of the present invention.

The invention is schematically illustrated in the drawings with respect to embodiments and will be described below in detail with respect to the drawings.

DETAILED DESCRIPTION OF THE INVENTION

Figure 1:
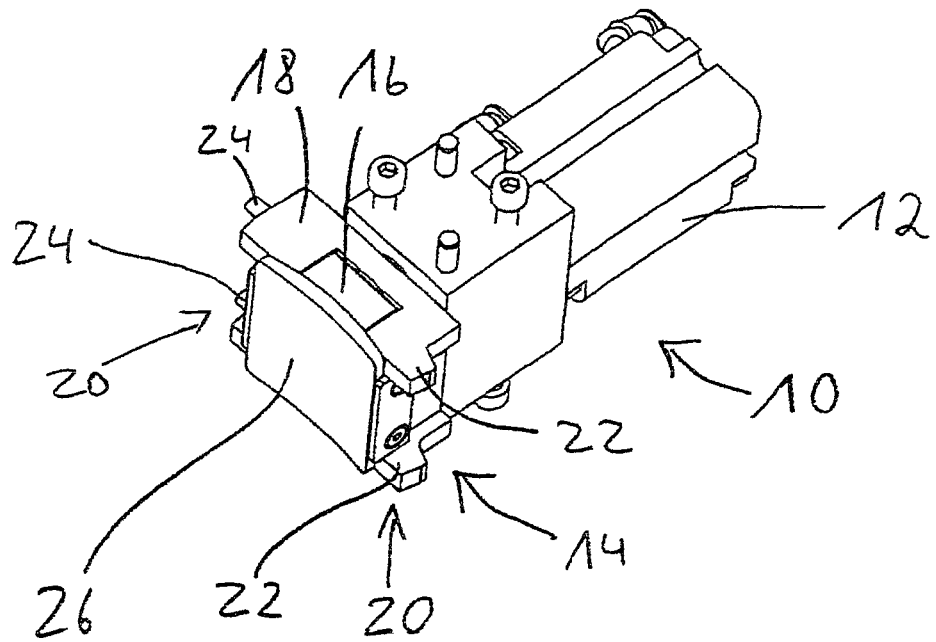
FIG. 1 shows a perspective view of an embodiment of the presented holding device.

FIG. 1 shows a perspective view of a holding device generally indicated by reference number 10. It comprises a cylinder 12 in which a piston not visible in this view is movable. This piston represents the movable part of the holding device 10. Furthermore, a support 14 is illustrated which has a core 16 of a magnetic material, e.g. an iron core, which is surrounded by a frame 18 of a non-magnetic material.

A guide 20 is laterally provided which comprises opposite shafts 22 and bolts 24. These elements of the guide 20 cooperate with guides of adjacent holding devices in order to guarantee that the pistons of the holding devices move synchronously.

The support 14 carries a magnet 26 retained by the retaining force of the iron core 16. This magnet 26 is approached to a surface to be equipped by actuating the piston of the holding device 10 until a force of attraction directed towards the surface exceeds the retaining force of the iron core 16 so that the magnet 26 is transferred to the surface. The movement of the piston can be continued during and after this transfer.

Figure 2:
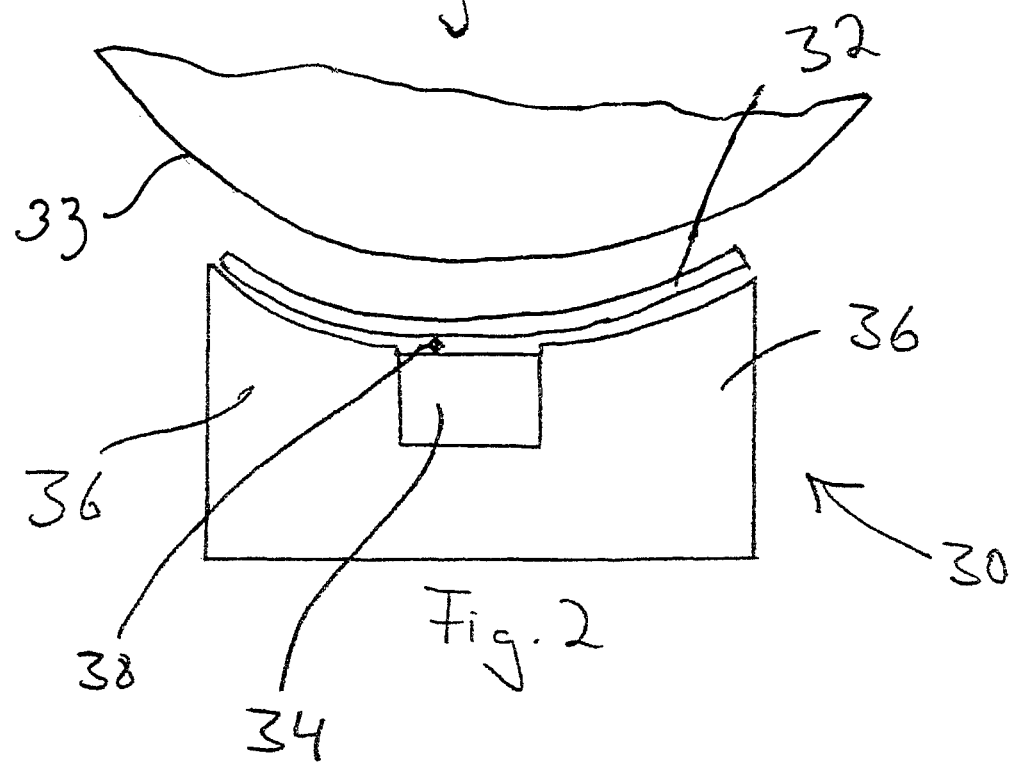
FIG. 2 shows a schematic view of a support of a holding device having a magnet.

Another support provided with reference number 30 is illustrated in FIG. 2. This also carries or retains a magnet 32 to be transferred to a surface 33 of a part.

Again, a core 34 of a magnetic material is provided which is fabricated from a frame 36 of a non-magnetic material. The ratio between the frame 36 and the core 34 determines the retaining force of the support 30.

Furthermore, the illustration shows that the core 34 is slightly offset backwards with respect to the frame so that a gap 38 exists between the magnet 32 and the core 34. This means that a force is only applied upon the external part of the magnet 32 when it is pressed against a surface, whereby the risk of breaking the magnet 32 is diminished.

Figure 3:
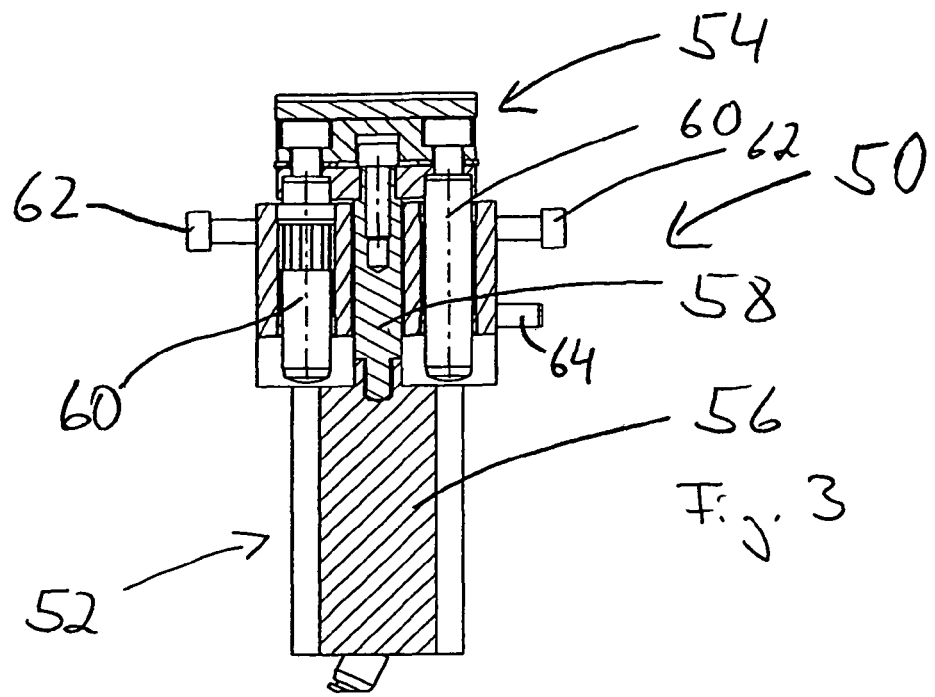
FIG. 3 shows a side view of an embodiment of the holding device.

FIG. 3 illustrates another holding device 50. It comprises a cylinder 52 and a support 54. The cylinder 52 has a cylinder space 56 including a piston 58 guided inside it, the front end of which carries the support 54. Guide bolts 60 are further provided for guiding the piston 58.

Figure 4:
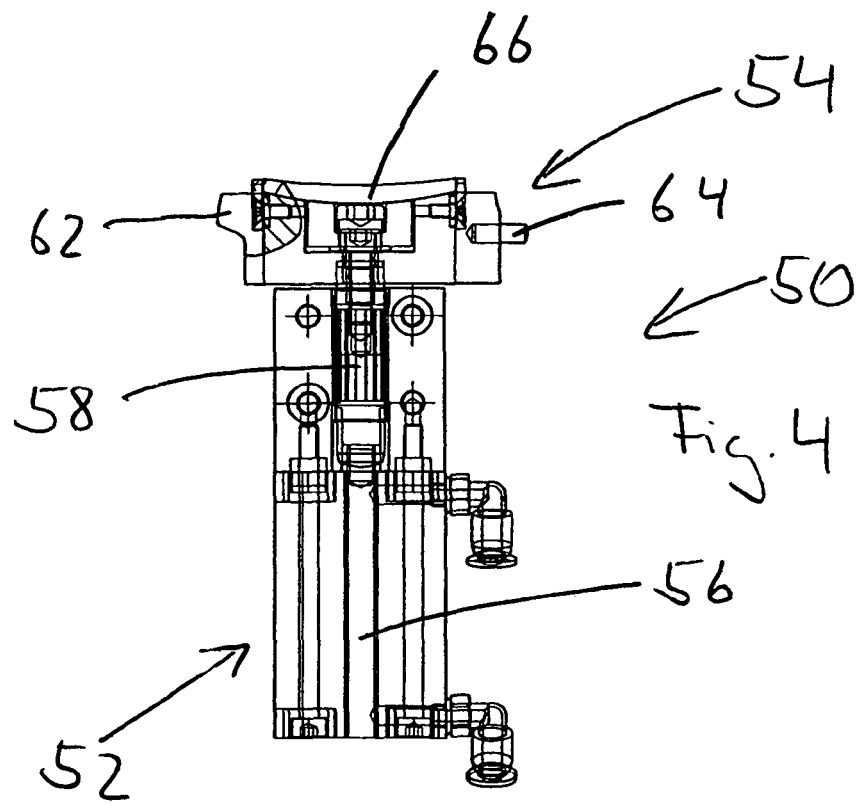
FIG. 4 shows the holding device of FIG. 3 in a position rotated by 90°.

FIG. 4 shows the holding device 50 rotated by 90°. The illustration shows the cylinder 52, the support 54 carrying a magnet 66, the cylinder body 56, the piston 58, the fastening screw 62 and the pin arrangement 64.

Shafts and one bolt are provided for synchronizing the piston 58 with adjacent holding devices.

Figure 5:
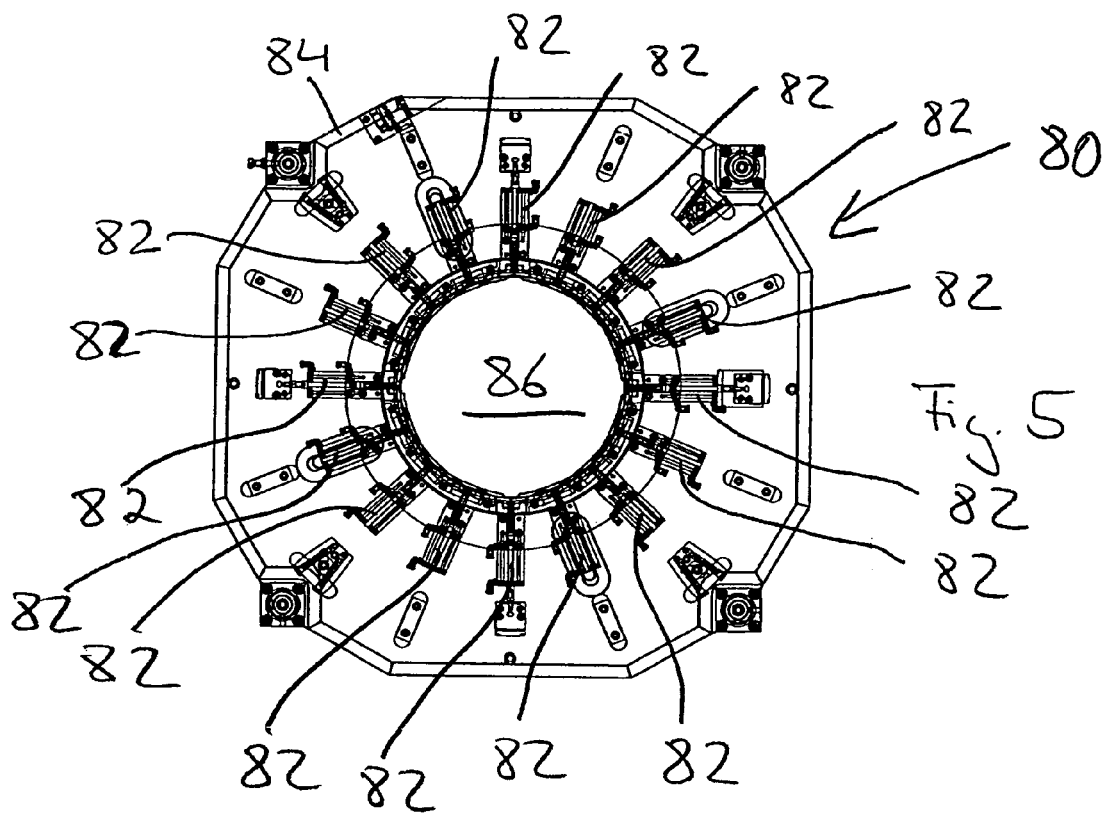
FIG. 5 shows a plan view of an embodiment of an arrangement having a plurality of holding devices.

FIG. 5 is a plan view of an arrangement for performing the described method generally indicated by reference number 80. The arrangement 80 comprises a number of circularly arranged holding devices 82.

The holding devices 82 are secured on a base plate 84 with the same interval between each other. A central opening 86 is provided through which a rotor to be equipped can be moved.

Figure 6:
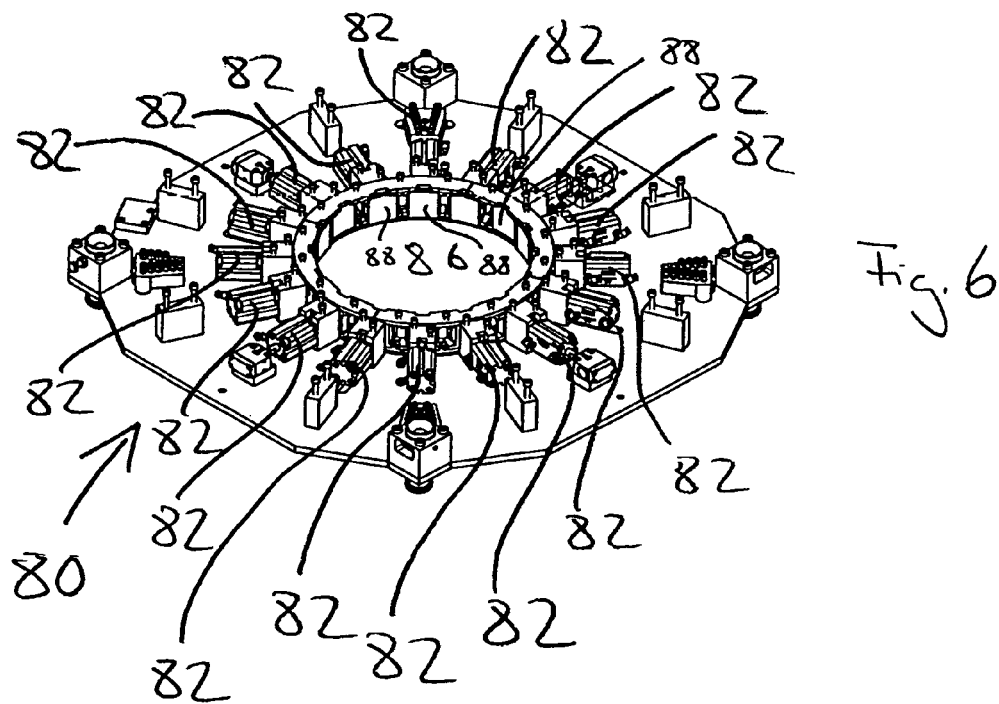
FIG. 6 shows a perspective view of the arrangement of FIG. 5.

FIG. 6 shows a perspective view of the arrangement of FIG. 5. Again, the holding devices 82 aligned to an opening 86 which are mounted on a base plate 84 are illustrated. Furthermore, the magnets 88 to be applied are illustrated.

We claim:

1. Method for applying at least one magnet to a surface of a part made of a magnetic material, comprising the steps of:
    retaining at least one magnet in a holding device with a retaining force;
    applying a force of attraction to the at least one magnet that acts contrarily to the retaining force and is substantially directed towards the part;
    moving continuously the at least one magnet towards the surface of the part while being retained in the holding device by the retaining force; and
    transferring the at least one magnet from the holding device to the surface of the part during the step of moving continuously the at least one magnet towards the surface as soon as the at least one magnet has reached a certain distance from the surface at which the force of attraction exceeds the retaining force.

2. Method according to claim 1, wherein a side of the at least one magnet facing the surface of the part is at least partially provided with an adhesive.

3. Method according to claim 1, wherein the holding device is further moved towards the surface after the at least one magnet has been transferred to the surface so that the at least one magnet is pressed to the surface of the part by a pressing force.

4. Method according to claim 1, wherein, after the at least one magnet has been transferred to the surface, a relative movement of the at least one magnet with respect to the surface of the part which is substantially orthogonal to the direction of approach is effected.

5. Method according to claim 4, wherein the relative movement is effected by moving the part.

6. Method according to claim 4, wherein the relative movement is effected by moving the holding device.

7. Method according to claim 1, wherein the at least one magnet comprises a plurality of magnets arranged in a row and applied to the surface of the part in one operation.

8. Method according to claim 1, wherein the surface of the part is a rotor of an electric motor.

9. Method for applying at least one magnet to a surface of a part made of a magnetic material, comprising the steps of:
    providing a holding device for holding the at least one magnet with a retaining force, the holding device including a piston which is movable in a cylinder space at a front end of which a support for retaining the at least one magnet is provided;
    applying a force of attraction to the at least one magnet that acts contrarily to the retaining force and is substantially directed towards the part;
    actuating the piston continuously to move the at least one magnet towards the surface of the part while being retained in the holding device by the retaining force; and
    transferring the at least one magnet from the holding device to the surface of the part during the step of actuating the piston continuously to move the at least one magnet towards the surface as soon as the at least one magnet has reached a certain distance from the surface at which the force of attraction exceeds the retaining force.

10. Method according to claim 9, and further comprising the step of providing the support with a core of magnetic material surrounded by a frame of non-magnetic material.

11. Method according to claim 9, and further comprising the step of providing a guide in an area of the support.

12. Method according to claim 11, and further comprising the step of providing the guide with at least one bolt and at least one shaft facing each other.

13. Method according to claim 9, and further comprising the step of sensing the position of the piston.

* * * * *